(12) United States Patent
Itokawa

(10) Patent No.: US 7,024,040 B1
(45) Date of Patent: Apr. 4, 2006

(54) IMAGE PROCESSING APPARATUS AND METHOD, AND STORAGE MEDIUM

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 09/650,738

(22) Filed: Aug. 30, 2000

(30) Foreign Application Priority Data

Sep. 2, 1999 (JP) ................................. 11-248237

(51) Int. Cl.
*G06K 9/48* (2006.01)
(52) U.S. Cl. ...................... 382/199; 382/224; 382/236; 382/256; 348/699
(58) Field of Classification Search ................ 382/236, 382/199, 173, 224; 348/402.1, 407.1, 413.1, 348/416.1, 699
See application file for complete search history.

(56) References Cited

U.S. PATENT DOCUMENTS

| | | | | |
|---|---|---|---|---|
| 5,699,443 | A | * | 12/1997 | Murata et al. ............... 382/107 |
| 5,999,651 | A | * | 12/1999 | Chang et al. ................ 382/215 |
| 6,310,920 | B1 | * | 10/2001 | Ogawa ................... 375/240.17 |
| 6,343,097 | B1 | * | 1/2002 | Kobayashi et al. ......... 375/240 |
| 6,810,079 | B1 | * | 10/2004 | Itokawa .................. 375/240.08 |

OTHER PUBLICATIONS

Huang et al. "Two Block-Based Motion Compensation Methods for Video Coding." IEEE Trans. on Circuits and Systems for Video Technology, vol. 6, No. 1, Feb. 1996, 99. 123-126.*
Chan et al. "Edge Oriented Block Motion Estimation for Video Coding." IEE Proc. Vision, Image and Signal Processing, vol. 144, No. 3, Jun. 1997, pp. 136-144.*
Giachetti et al. "Dynamic Segmentation of Traffic Scenes." Proc. of Intelligent Vehicles '95 Symposium, Sep. 25, 1995, pp. 258-263.*
Xu et al. "An Accurate Region Based Object Tracking for Video Sequences." IEEE 3rd Workshop on Multimedia Signal Processing, Sep. 13, 1999, pp. 271-276.*
"Snakes: Active Contour Models", M. Kass et al., International Journal of Computer Vision, vol. 1, No. 3, pp 321-331, 1988.

* cited by examiner

*Primary Examiner*—Samir Ahmed
*Assistant Examiner*—Charles Kim
(74) *Attorney, Agent, or Firm*—Fitzpatrick, Cella, Harper & Scinto

(57) ABSTRACT

An image processing apparatus and method wherein consecutive image data is input, the image data is divided into blocks each constituted of a plurality of pixels, a motion vector of each block is detected, a border block is judged in accordance with the detected motion vector, the border block forming a boundary area between an object area and a background area corresponding to a background of the object area, and image data in the object area is extracted in accordance with the judged border block.

18 Claims, 16 Drawing Sheets

▨ BACKGROUND BLOCK
▨ FOREGROUND BLOCK
▨ BORDER BLOCK

☒ BACKGROUND BLOCK
☒ FOREGROUND BLOCK
☒ BORDER BLOCK

⊟ BACKGROUND BLOCK

⊠ FOREGROUND BLOCK

⊡ PROVISIONAL BACKGROUND BLOCK

⊠ PROVISIONAL FOREGROUND BLOCK

▨ BACKGROUND BLOCK

▨ FOREGROUND BLOCK

▨ BORDER BLOCK

☐ BACKGROUND BLOCK
☒ FOREGROUND BLOCK
▨ BORDER BLOCK

IMAGE PROCESSING APPARATUS AND METHOD, AND STORAGE MEDIUM

BACKGROUND OF THE INVENTION

1. Field of the Invention

The present invention relates to an image processing method and apparatus, and to a storage medium storing a program realizing the image processing method. More particularly, the invention relates to an image processing method and apparatus for extracting objects from moving images, and to a storage medium storing software program codes for executing the image processing method.

2. Related Background Art

A compression coding method has been studied recently by which moving images are compression encoded in the unit of an object which is assumed to be a constituent of a moving image. Standardization works are under progress as MPEG-4. Since an object can take an arbitrary shape, it is expressed by a combination of data called a shape, which is representative of shape information and data called a texture, which is representative of the contents of an image.

Known object generation methods include a chromakey separation method, a method of generating an object through computer graphics (CG), a method of extracting an object from a natural image, and the like.

The chromakey method prepares a uniform blue background called a blue back and sets it in a studio, and cuts the blue back from the picked-up image to extract the object.

With computer graphics (CG), an image having a desired shape can be generated at any time so that a particular extraction method is not necessary. In the case of an animation image, each cell image is considered as an object so that the image can be processed in a manner similar to CG.

As a means for extracting an object from a natural image, active contour model energy minimization, called a snake, is well known (e.g., "Snakes: Active Contour Models", by Michael Kass, Andrew Witkin, and Demetri Terzopoulos, International Journal of Computer Vision, Vol. 1, No. 3, pp. 321–331, 1988).

With the snake, an energy function is defined which takes a minimum energy when a contour (outline) is extracted, and a local minimum is calculated through iteration using a proper initial value. The energy function is defined by a linear sum of an external energy which is restriction on passing an edge point and an internal energy which is restriction on smoothness.

In order to use a snake, it is necessary to roughly designate an outline of an object to be extracted, as an initial outline. In the case of a moving image, it is necessary to set an initial outline of each frame. However, automatic setting is possible by using the extraction results of a previous frame as an initial value of a current frame. Techniques of obtaining an outline between frames are called tracking.

These extraction methods are all associated with severe problems. Namely, the chromakey method requires a uniform background color, and if it is required that extraction is to be performed at a high precision, a studio set of a robust scale is required. If the object contains the background color, the object cannot be correctly extracted so that the color of the object is limited.

Although computer graphics and animation do not require an extraction process, they are accompanied with a fatal problem that the quality of images is far inferior to natural images picked-up with a video camera.

The method of extracting an object from a natural image has on one hand the advantages that restriction on image contents is small and versatile processing is possible, and on the other hand the disadvantages that it is necessary to designate an initial outline correctly to some degree. The reason is because the calculation results of a local minimum of an active outline model are greatly influenced by the initial outline. In other words, if the initial outline is different from an actual object outline, the convergence results of calculation do not coincide with the actual object outline. Generally, a user sets an initial outline through graphical user interface (GUI) such as a mouse. Manual setting of an initial outline is not easy and initial outlines are hard to be set with good reproductivity. The more complicated the outline shape, the larger the user burden.

SUMMARY OF THE INVENTION

It is an object of the invention to provide an image processing apparatus and method capable of extracting an object correctly with less burden on user manipulation, and to provide a storage medium storing a program realizing such a method.

In order to achieve the above object, according to one aspect of the present invention, there is provided an image processing apparatus and method wherein consecutive image data is input, the input image data is divided into blocks each constituted of a plurality of pixels, a motion vector of each block is detected, a border block is judged in accordance with the detected motion vector, the border block forming a boundary area between an object area and a background area corresponding to a background of the object area, and image data in the object area is extracted in accordance with the judged border block.

According to another aspect of the present invention, there is provided a storage medium which stores program codes for image processing steps, the program codes comprising codes for an input step of inputting consecutive image data, codes for a dividing step of dividing the image data into blocks each constituted of a plurality of pixels, codes for a detecting step of detecting a motion vector of each block, codes for a judging step of judging a border block in accordance with the motion vector detected by the detecting step, the border block forming a boundary area between an object area and a background area corresponding to a background of the object area, and codes for an extracting step of extracting image data in the object area in accordance with the border block judged by the judging step.

Other objects, features and advantages of the present invention will become apparent from the following detailed description taken in conjunction with the accompanying drawings.

DETAILED DESCRIPTION OF THE PREFERRED EMBODIMENTS

Embodiments of the invention will be described in detail with reference to the accompanying drawings.

Figure 1:
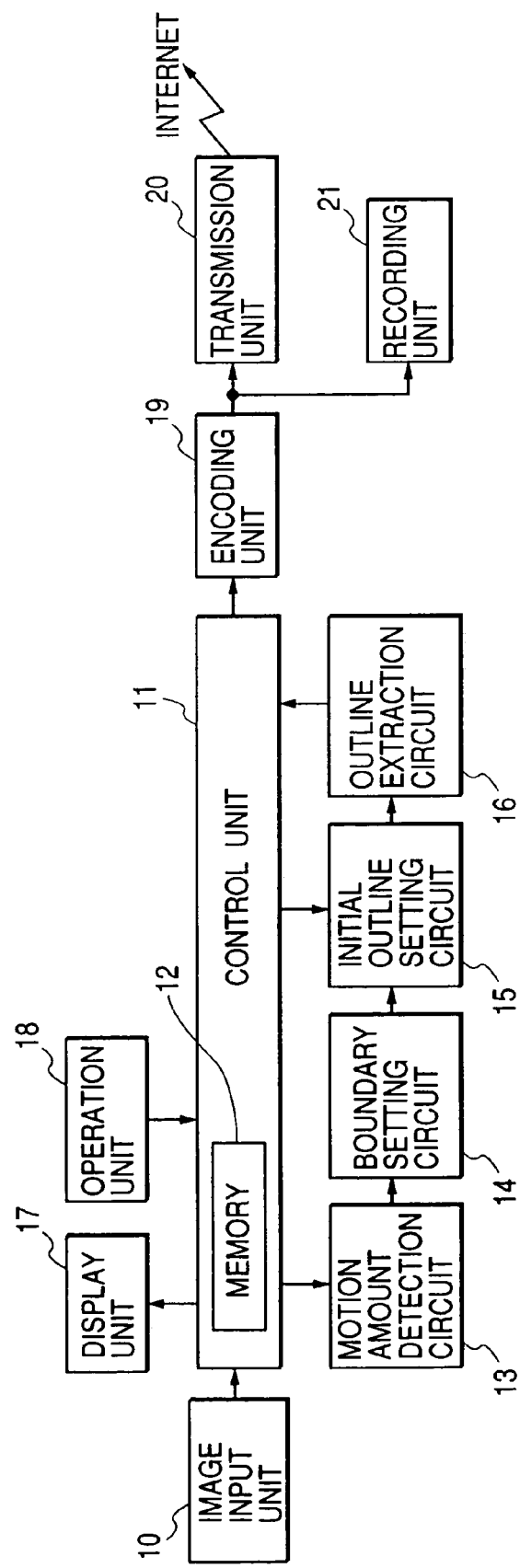
FIG. 1 is a block diagram showing the structure of an image processing apparatus according to a first embodiment of the invention.

FIG. 1 is a block diagram showing the structure of an image processing apparatus according to the first embodiment of the invention.

Referring to FIG. 1, an image input unit 10 includes at least an image reproducing apparatus such as a video camera, a digital VTR and a DVD, and supplies moving image data to a control unit 11. The control unit 11 includes a memory 12 for temporarily storing the moving image data supplied from the image input unit 10, and controls the supply of moving image data and the operation of each circuit and component. The memory 12 temporarily stores image data of several frames input from the image input unit 10. A motion amount detection circuit 13 detects a motion amount (motion vector) in a desired frame in the unit of a block, by using image data of a plurality frames temporarily stored in the memory 12.

In accordance with the detection results of the motion amount detection circuit 13, a boundary setting circuit 14 obtains a boundary between a background area and an object area. An initial outline setting circuit 15 sets an initial outline in accordance with the boundary obtained by the boundary setting circuit 14. An outline extraction circuit 16 converges the initial outline toward the outline of an actual object and supplies the convergence results to the control unit 11 as outline information. The outline information obtained by the outline extraction circuit 16 is set as the next frame initial outline to the initial outline setting circuit 16 at the timing of a frame update.

A display unit 17 displays moving image data input from the image input unit 10, extracted image data of an object, or an outline image of an object. An operation unit 18 selects image data.

In accordance with the outline information obtained by the outline extraction circuit 20, the control unit 11 reads the image data of an object from the memory 12 and supplies it to an encoding unit 17. The control unit 11 also supplies the encoding unit 17 with background data excepting image data of the object and with shape information corresponding to the outline information obtained by the outline extraction circuit 16.

The encoding unit 17 encodes image data of the object, image data of the background, and shape information, independently from each other. A transmission unit 18 externally transmits the data encoded by the encoding unit 17 over the Internet, by using a predetermined transmission format. A recording unit 19 records the data encoded by the encoding unit 17 in a hard disk, a memory, an optical disk, or the like.

Figure 2:
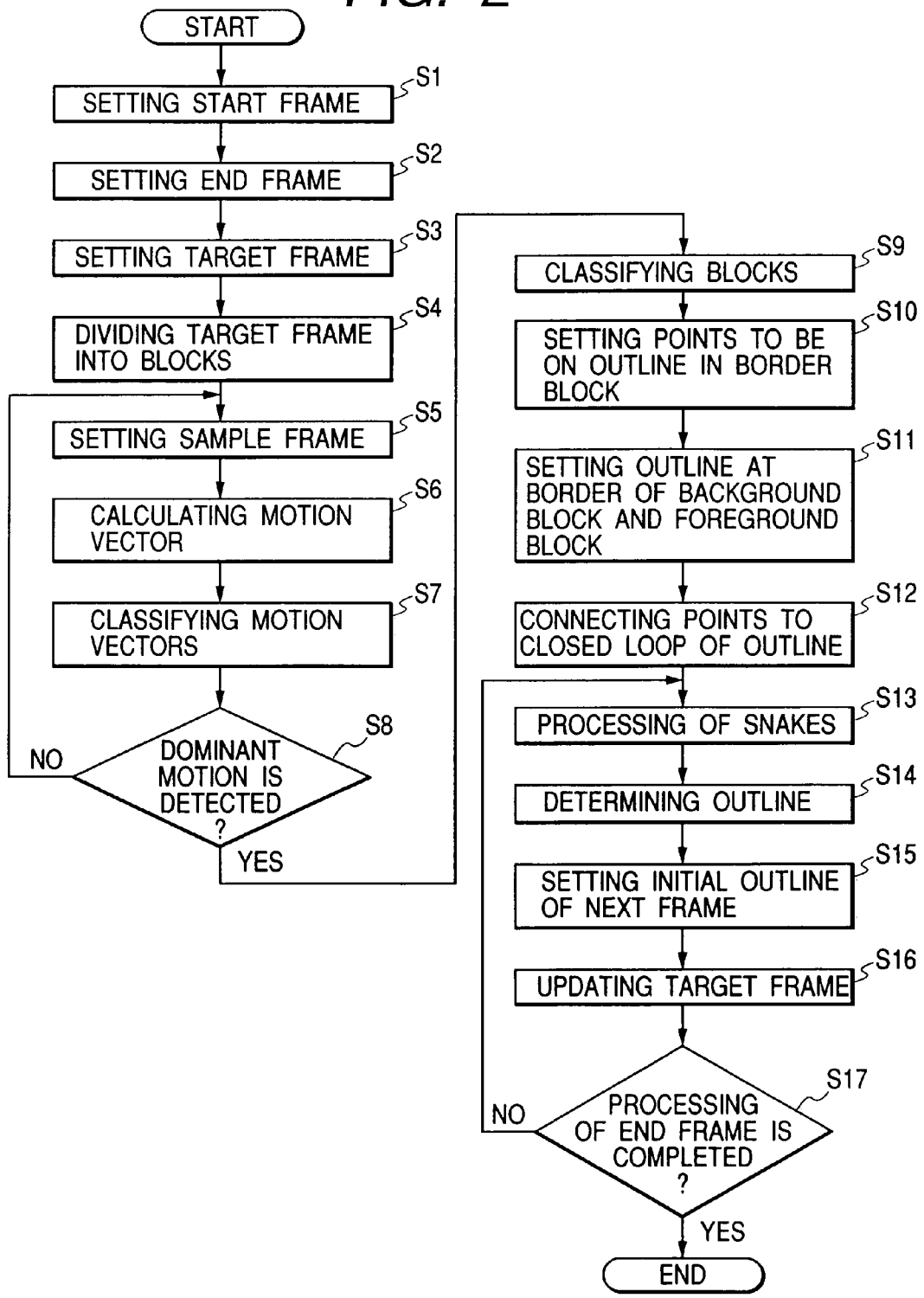
FIG. 2 is a flow chart illustrating an object extracting process to be executed by the image processing apparatus constructed as shown in FIG. 1.

FIG. 2 is a flow chart illustrating an object extracting process to be executed by the image processing apparatus constructed as shown in FIG. 1.

Figure 3:
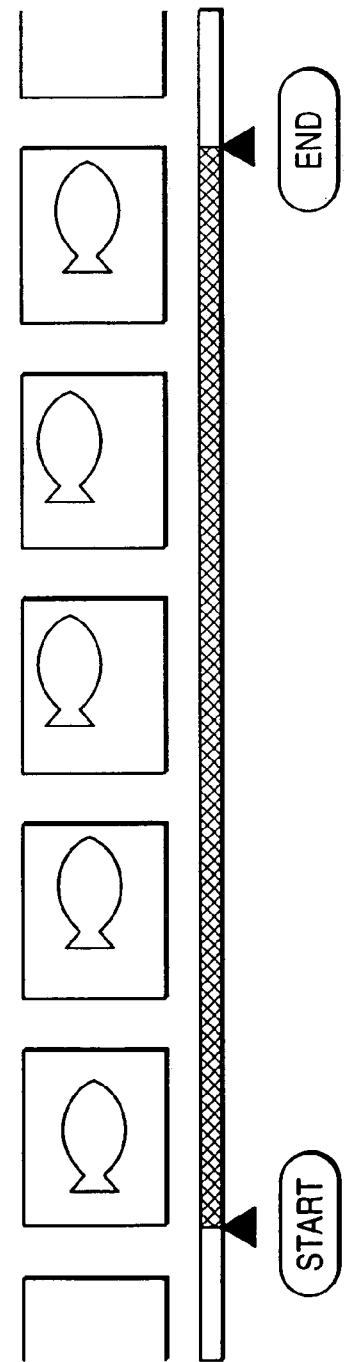
FIG. 3 is a schematic diagram illustrating settings of a start frame and an end frame.

First, a start frame and an end frame are determined (Step S1, Step S2). These Steps define a period during which an extracting object exists. For example, as shown in FIG. 3, using a graphical user interface which displays a series of frames at the same time on the screen of the display unit 17, the start frame and end frame can therefore be set with ease from the operation unit 18.

Next, a top frame containing the extracting object is set as a target frame (Step S3). The start frame is generally the target frame.

Figure 4:
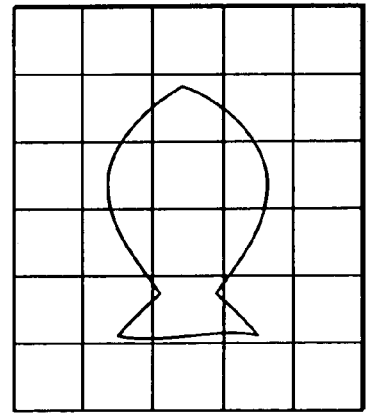
FIG. 4 is a diagram illustrating an example of dividing a target frame into blocks.

As shown in FIG. 4, the target frame is divided into blocks along horizontal and vertical directions. The block size is arbitrary. For example, assuming that the image size is 720×480 pixels and the block size is 16×16 pixels, the number of blocks is (720/16)×(480/16)=1350.

If R, G and B are used for color space representation, the total number of blocks per one frame is 1350×3=4050. If a format of luminance components and color difference components of 4:2:2 is used, the total number of blocks is 1350×2=2700. If only the luminance signal is used, the total number of blocks is 1350.

Figure 5:
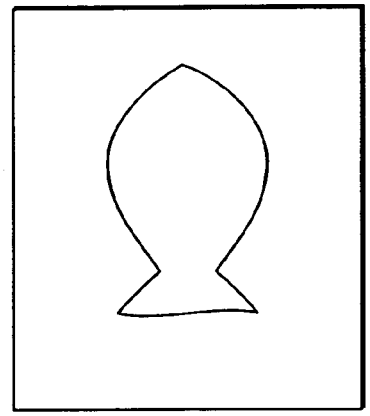
FIG. 5 is a diagram showing an example of an image of a sample frame.

After the process at Step S4, a sample frame is set (Step S5). Generally a frame adjacent in the time axis to the target frame is used as the sample frame. In the example of the moving images shown in FIG. 3, the sample frame is the frame shown in FIG. 5 in which the object moved to the right relative to the target frame shown in FIG. 4.

After the process at Step S5, the motion amount detection circuit 13 detects a motion vector for each block in the sample frame (Step S6).

On the assumption that a motion of the target is in conformity with two-dimensional affine transformation, the following equations stand between the position (x, y) on the target frame and the position (X, Y) on the sample frame:

$$X = a \times x + b \times y + c \quad (1)$$

$$Y = d \times x + e \times y + f \quad (2)$$

On the assumption that the motion is only a parallel movement, the equations (1) and (2) can be simplified to:

$$X = x + c \tag{3}$$

$$Y = y + f \tag{4}$$

A square sum of differences is calculated by moving the search area in accordance with the above-described equations, and the position at which the square sum of differences is minimum in the search area is determined as the position with matching and the motion vector value is stored.

Figure 6:
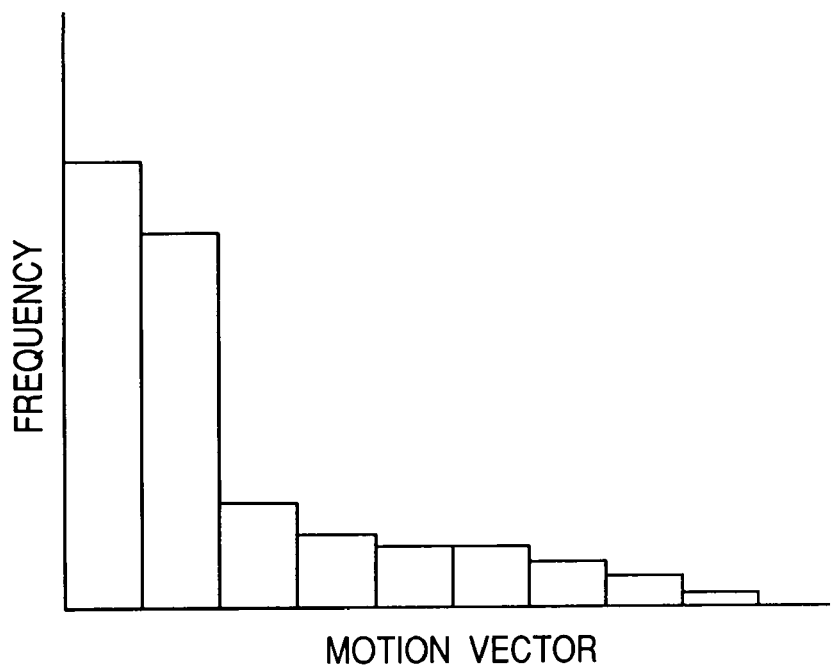
FIG. 6 is a histogram showing blocks classified by motion vectors.

After the motion vector values of all blocks in the frames are obtained at Step S6, the boarder setting circuit 14 classifies the moving vectors (Step S7). The substantially same motion vector values are registered in the same group. If the search area is a range of +16 pixels in the horizontal and vertical directions and a parallel movement with one pixel precision is performed, then the types of motion vectors to be generated are 33×33=1089 patterns. FIG. 6 is a histogram showing an example of motion vectors in blocks classified in the above-described manner. The abscissa of FIG. 6 represents a motion vector and the ordinate represents an occurrence frequency or the number of blocks. Along the abscissa, the motion vectors are arranged in the order of larger occurrence frequency.

If a dominant motion is not detected in the whole frame area (Step S8), the flow returns to Step S5 whereat the sample frame is changed to again calculate motion vectors (Step S6) and classify motion vectors (Step S7).

Figure 7:
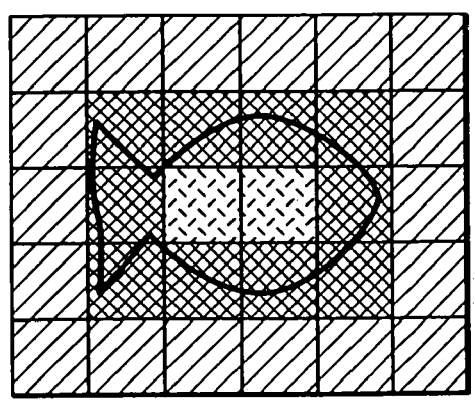
FIG. 7 is a diagram showing an example of block classification.
Figure 8:
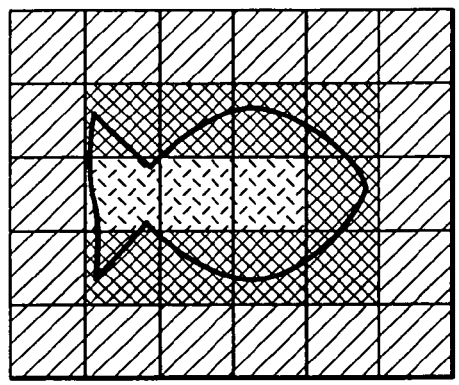
FIG. 8 is a diagram showing another example of block classification.

If a dominant motion is detected in the whole frame area (Step S8), the blocks are classified into three groups: background blocks, object (foreground) blocks and border blocks including the background and object (Step S9). This grouping method will be later described in detail. For example, as shown in FIG. 7, border blocks surround foreground blocks, and background blocks surround the border blocks. Depending upon division into blocks, the foreground block is not surrounded by the border block in some cases as shown in FIG. 8. Such cases may occur when most of blocks are background blocks and there are only a small number of blocks containing the object, or conversely, when most of blocks contain the object and there are only a small number of background blocks.

Next, the initial outline setting circuit 15 sets an initial outline.

The blocks judged as the border blocks contain a border line in its area. Therefore, points constituting the initial outline are set in each block (Step S10). If the background object is contact with the object block, points constituting the initial outline are set on the contact line (Step S11). These points are sequentially interconnected to form a closed loop which is set as the initial outline (Step S12).

Figure 9:
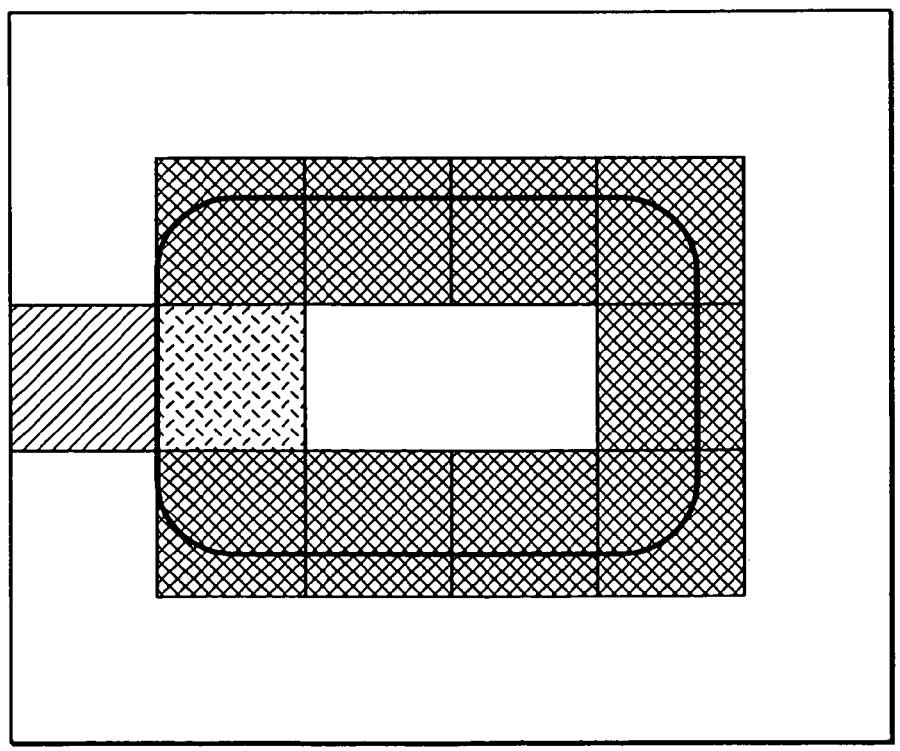
FIG. 9 is a diagram showing an example of an initial outline according to the first embodiment.
Figure 10A:
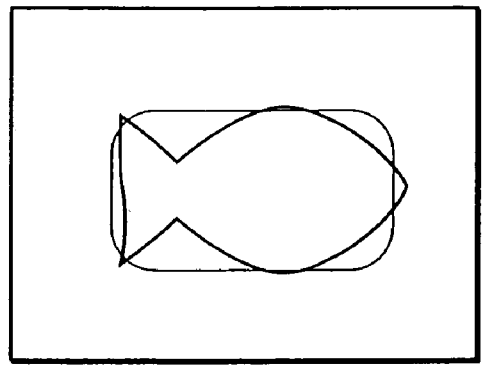
FIGS. 10A, 10B, 10C and 10D are schematic diagrams illustrating convergence of an outline according to the first embodiment.
Figure 10B:
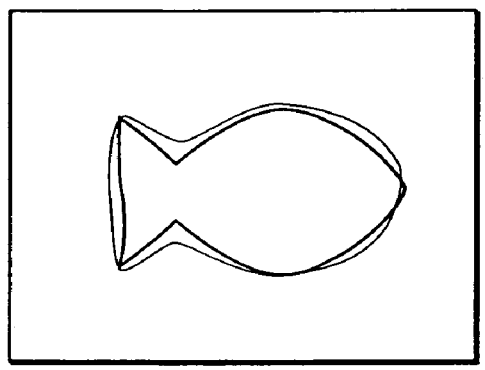
Figure 10C:
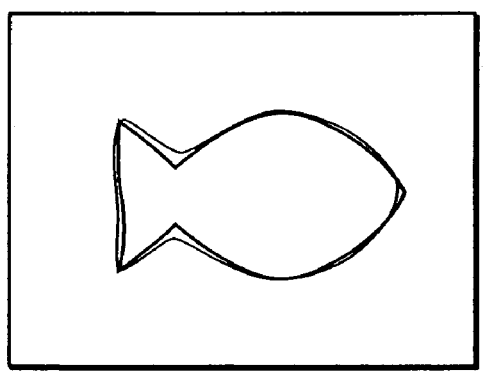
Figure 10D:
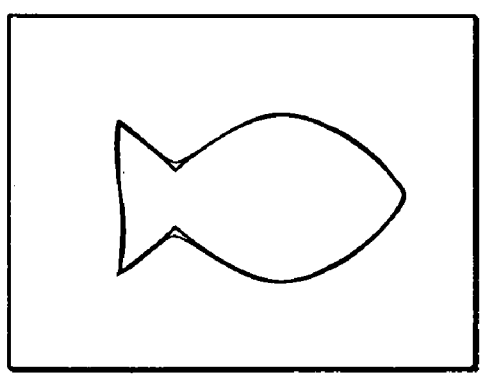

FIG. 9 shows an example of setting an initial outline. The border line on which the background block and object block contact each other is used as the initial outline, and in the border blocks, the initial line is set so as to divide the inside and outside of the object blocks equally.

Next, the outline extraction circuit 16 converges the initial outline set as described above into an object outline (Step S13). For example, a process called a snake is executed.

Generally, the snake is an outline extraction model whose shape is determined as a minimum energy state by deforming an outline (closed cured line) which is expressed by parameters on an image plane (x, y), such as v(s)=(x(s), y(s))

where $0 \leq s \leq 1$, so as to minimize the energy function defined by the following equation (5):

$$Esnake(v(s)) = \int_0^1 (Eint(v(s)) + Eimage(v(s)) + Econ(v(s)))ds \tag{5}$$

$$Espline(v(s)) = \frac{1}{2} \cdot \{\alpha(v'(s))^2 + \beta(v''(s))^2\} \tag{6}$$

$$Eedge(v(s)) = -\frac{1}{2} \cdot \gamma |\nabla l(v(s))|^2 \tag{7}$$

where Eint indicates an internal energy, Eimage indicates an image energy, and Econ indicates an external energy. Econ is used for forcibly applying an external force to the snake. The external energy is used when necessary.

Espline given by the equation (6) indicating a smoothness of the outline is often used as Eint. v'(s) and v''(s) are first- and second-order differentiation of v(s), respectively. α and α are weight coefficients and are generally the function of s. However, in this embodiment, they are considered as a constant. By minimizing Espline, the snake receives a shrinking force.

Eedge given by the equation (7) defined by using an image luminance l(v(s)) is often used as Eimage. Eedge indicates a luminance gradient. The snake receives an attraction force to an edge through minimization. γ is a weight coefficient of an image energy.

FIGS. 10A to 10D illustrate how the initial outline converges so as to match the object outline.

After the outline is determined in this way (Step S14), the first frame object extracting process is completed. In accordance with the extraction results, the initial outline of the next frame is set (Step S15). In this case, according to the simplest method, the extraction results of the outline of the previous frame are set as the new initial outline.

The target frame is updated (Step S16) to execute again Steps S13 to S16. When the target frame becomes the end frame and the processes at Steps S13 to S16 are executed (Step S17), it means that the object extracting process was completed for all frames, to thereby terminate a series of processes.

Figure 11:
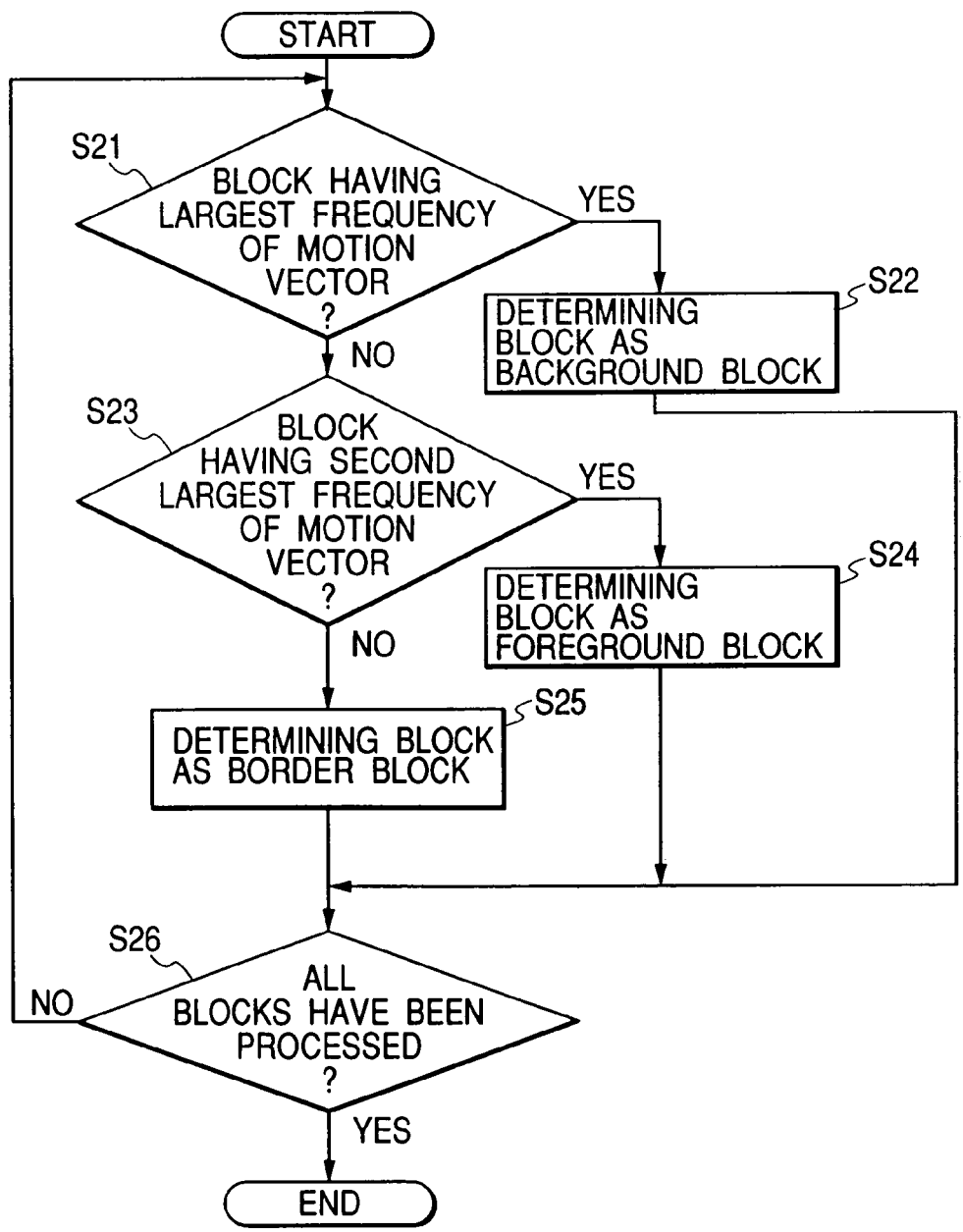
FIG. 11 is a flow chart illustrating a block classifying process at Step S9 shown in FIG. 2.

Next, with reference to FIG. 11, the block classifying process at Step S9 shown in FIG. 2 will be described. FIG. 11 is a flow chart illustrating the block classifying process at Step S9 shown in FIG. 2. The flow chart shown in FIG. 11 is only illustrative, and it is conceivable that many methods may by used for the classification of this type.

Figure 12:
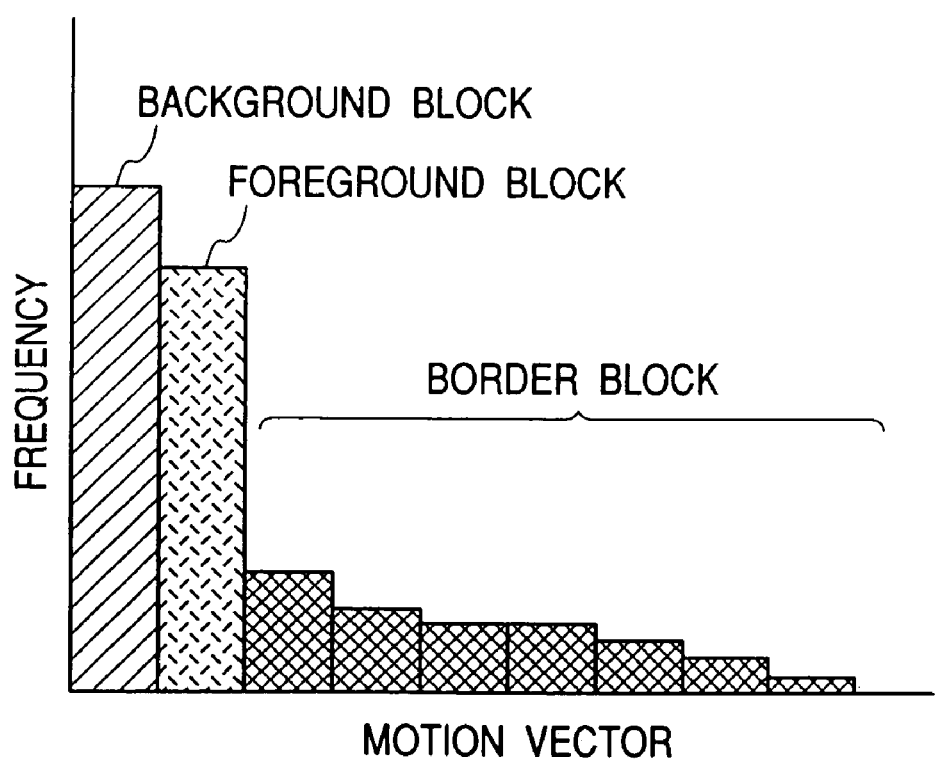
FIG. 12 is a diagram showing an example of block classification of the histogram shown in FIG. 6.

A block having the largest occurrence frequency of motion vector is determined as the background block (Steps S21, S22). A block having a second largest occurrence frequency of motion vector is determined as the foreground block (Steps 23, S24). A block neither the background block nor the foreground block is determined as the border block (Step S25). All blocks are classified in accordance with the above-described criterion (Step S26). An example of classification of motion vectors shown in FIG. 6 is therefore classified into background blocks, foreground blocks and border blocks as shown in FIG. 12.

This classifying process relies on the assumption that the background occupies the broadest area in each frame. Therefore, the block having the second largest occurrence frequency of motion vector is determined as the foreground block. If there is only one object in a frame, the number of blocks having the third or more largest occurrent frequency of motion vector becomes extremely small. These blocks are those whose corresponding parts were not able to be found. If a block contains both the background area and object area, such the block cannot be found in the search area of the sample frame. Therefore, this block takes one of a variety of motion vector values. This block is therefore determined as the border block.

In this embodiment, the assumption is made that the background occupies the broadest area in each frame. If the foreground occupies the broadest area in each frame, a block having the largest occurrence frequency of motion vector is determined as the foreground block, and a block having the second largest occurrence frequency of motion vector is determined as the background block.

Also in this embodiment, although discrimination between the block classified into the background block and the block classified into the foreground block is determined in accordance with the occurrence frequency of motion vector, the position information may be taken into consideration to determine a block in contact with the frame side, as the background block.

Figure 13:
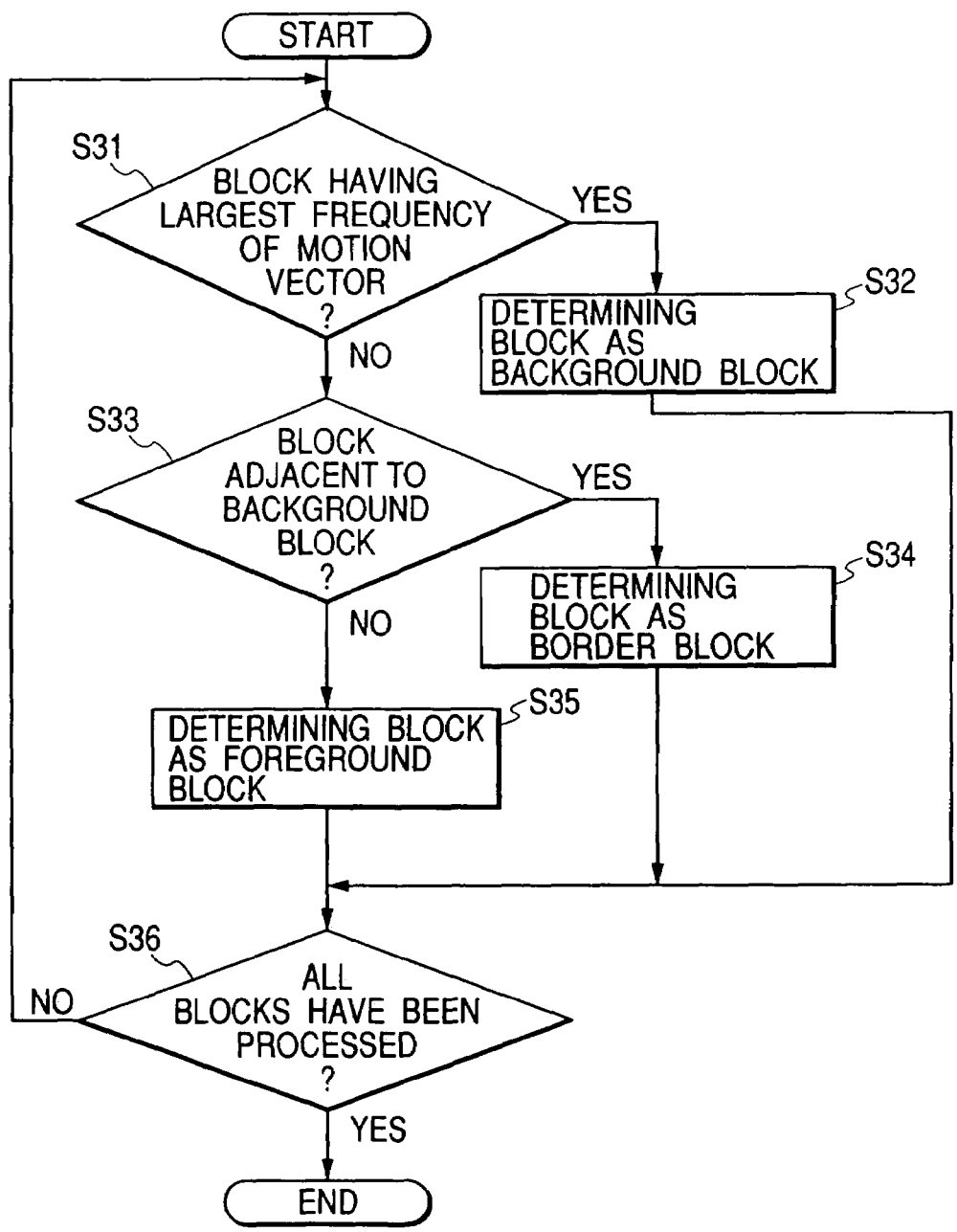
FIG. 13 is a flow chart illustrating the block classifying process according to another embodiment.

FIG. 13 is a flow chart illustrating the block classifying process according to another embodiment of the invention.

A block having the largest occurrence frequency of motion vector is determined as the background block (Steps S31, S32). A block which is not a block having the first largest occurrence frequency of motion vector but adjacent to the block having the largest occurrence frequency of motion vector is determined as the border block (Steps 33, S34). A block neither the background block nor the border block is determined as the foreground block (Steps S33, S35). All blocks are classified in accordance with the above-described criterion (Step S36).

With the method illustrated in FIG. 13, a block adjacent to the background block is determined as the border block. Conversely, after the foreground block is determined, a block adjacent to the foreground block may be determined as the border block, with expected similar or the same results.

Figure 14:
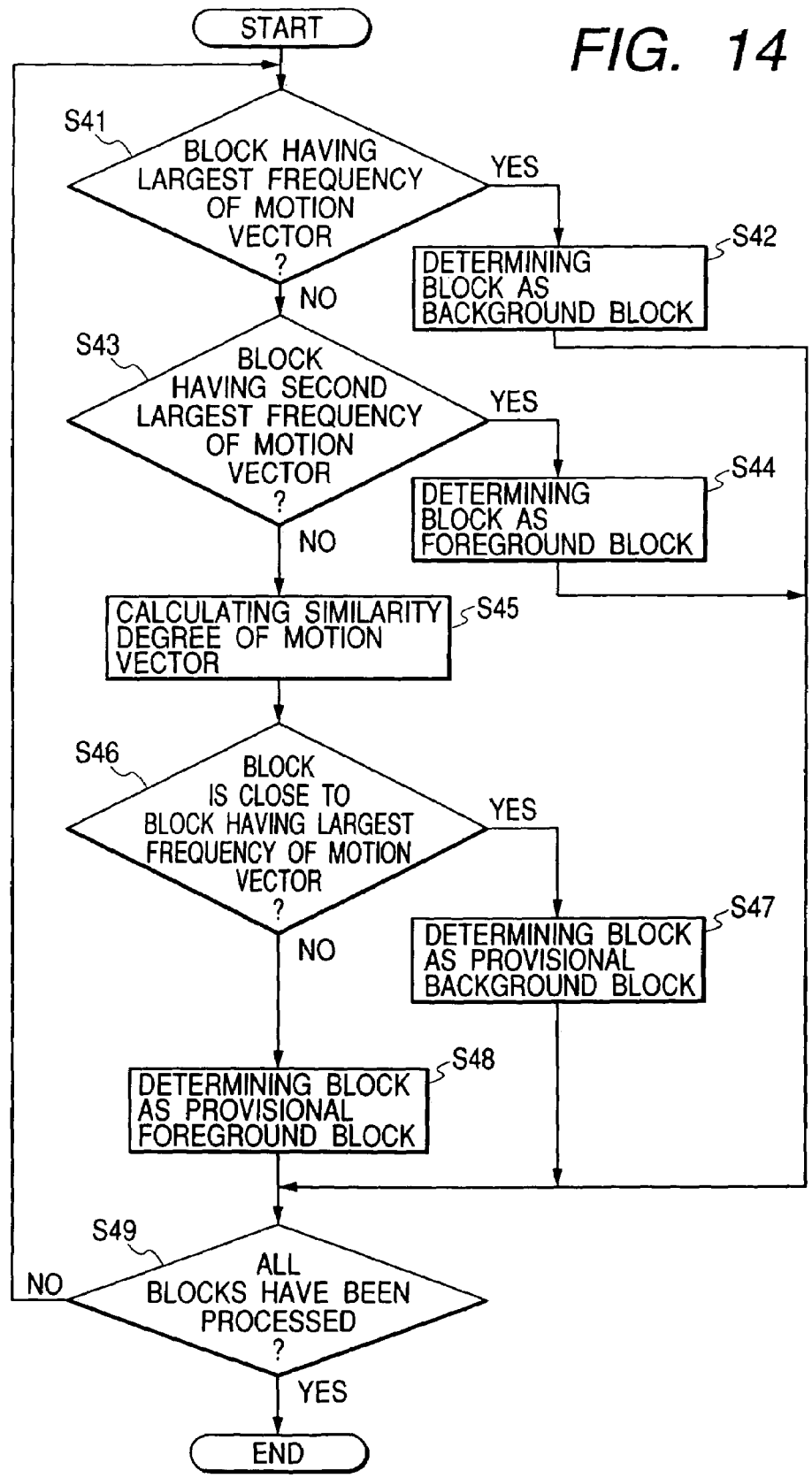
FIG. 14 is a flow chart illustrating the block classifying process according to another embodiment.

Another grouping method is to calculate a similarity degree of motion vector of a block having the third or more largest occurrence frequency of motion vector and classify the block either to the block having the first largest occurrence frequency or to the block having the second largest occurrence frequency. FIG. 14 is a flow chart illustrating such a method.

A block having the largest occurrence frequency of motion vector is determined as the background block (Steps S41, S42). A block having a second largest occurrence frequency of motion vector is determined as the foreground block (Steps S43, S44). If a block having the third or more largest occurrence frequency of motion vector is detected (Step S43), motion vector similarity degrees of the motion vector of such the block to those of the background and foreground blocks are calculated (Step S45). This calculation is made to judge whether the motion vector value of that block is nearer either to the motion vector value of the group having the first largest occurrence frequency or to the motion vector value of the group having the second largest occurrence frequency. For example, the distance between motion vectors is calculated from the inner product thereof. If it is judged that the motion vector value is nearer to the motion vector of the group having the first largest occurrence frequency (Step S46), then the block is provisionally determined as the background block (provisional background block) (Step S47), whereas if it is judged as nearer to the motion vector of the group having the second largest occurrence frequency (Step S46), then the block is provisionally determined as the foreground block (provisional foreground block) (Step S48). The above processes are executed for all blocks (Step S49).

Figure 15:
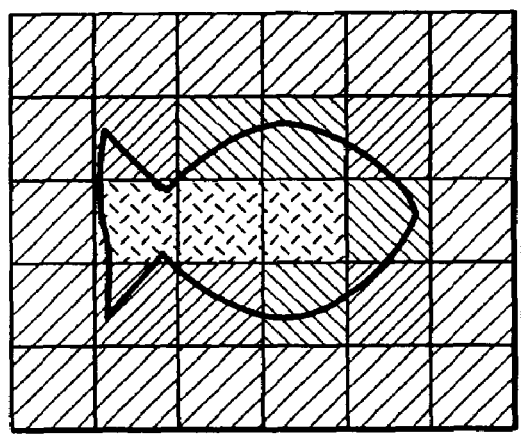
FIG. 15 is a diagram showing an example of the results of the provisional block classifying process illustrated in FIG. 14.

An example of the provisional classification results by the method illustrated in FIG. 14 is shown in FIG. 15. Blocks adjacent to both the block having the first largest occurrence frequency of motion vector and the block having the second largest occurrence frequency of motion vector (provisional background and foreground blocks shown in FIG. 14) become the border blocks.

Figure 16:
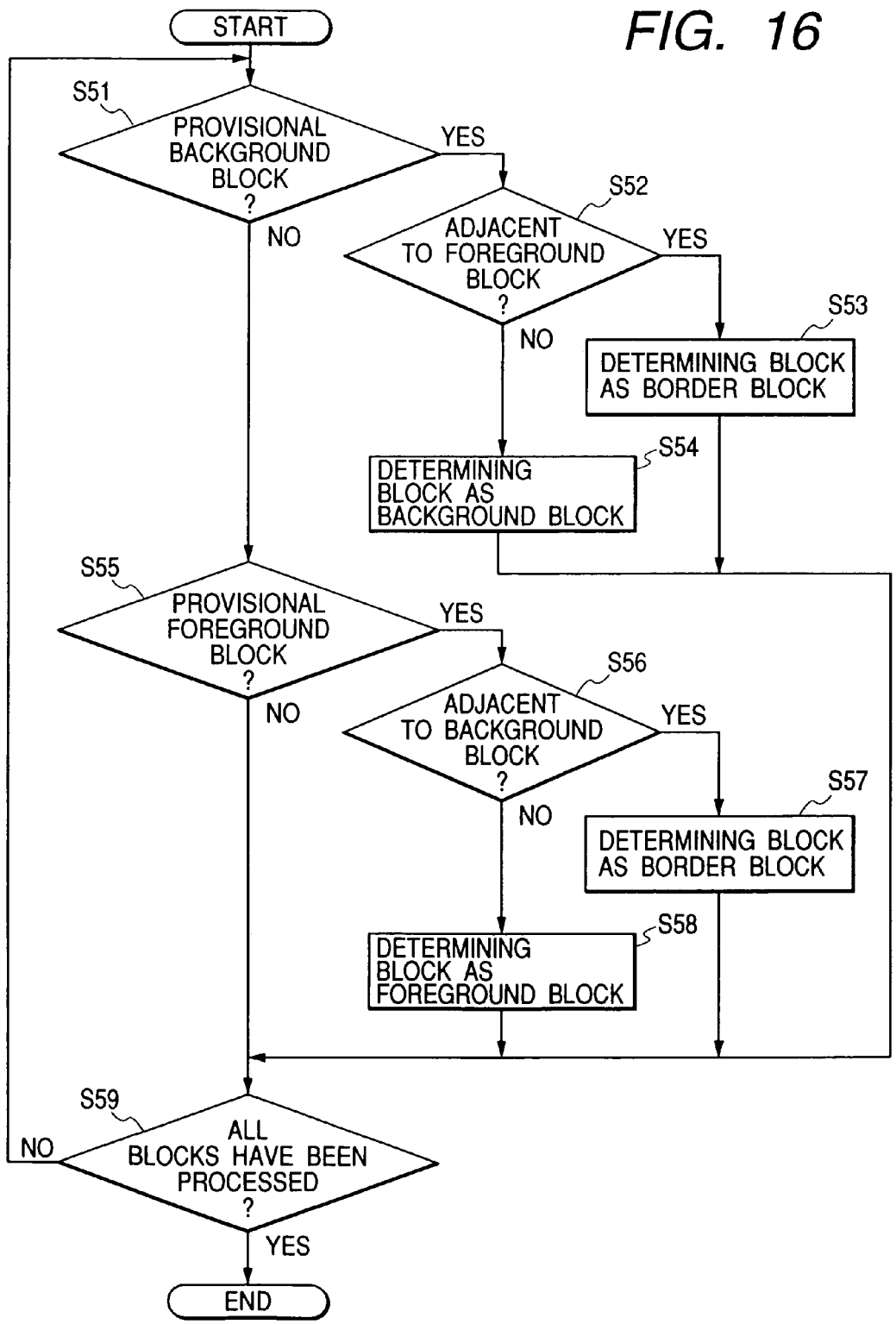
FIG. 16 is a flow chart illustrating a process of finally determining provisional blocks.
Figure 17:
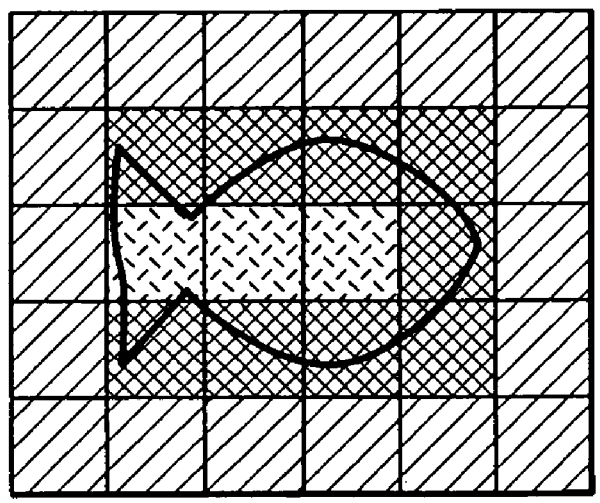
FIG. 17 is a diagram showing an example of the results of the process illustrated in FIG. 16.

FIG. 16 is a flow chart illustrating the operation of finally determining the border block by using the classification results obtained by the method illustrated in FIG. 14. It is judged whether the subject block is the provisional background block or not (Step S51). If it is the provisional background block (Step S51), it is checked whether the provisional background block is adjacent to the foreground block (Step S52). If the provisional background block is adjacent to the foreground block (Step S52), this block is determined as the border block (Step S53), whereas if it is not adjacent to the foreground block (Step S52), this block is determined as the background block (Step S54). For the provisional foreground block, a similar operation is performed (Step S55). If this provisional foreground block is adjacent to the background block (Step S56), it is determined as the border block (Step S57), whereas if not, it is determined as the foreground block (Step S58). The blocks other than the provisional blocks are maintained as previously determined. The above processes are executed for all blocks (Step S59). The final classification results for the example shown in FIG. 15 given by the method illustrated in FIG. 16 are shown in FIG. 17.

An image processing apparatus according to the second embodiment will be described. The structure of the apparatus is the same as that shown in FIG. 1, and so the description thereof is omitted.

Figure 18:
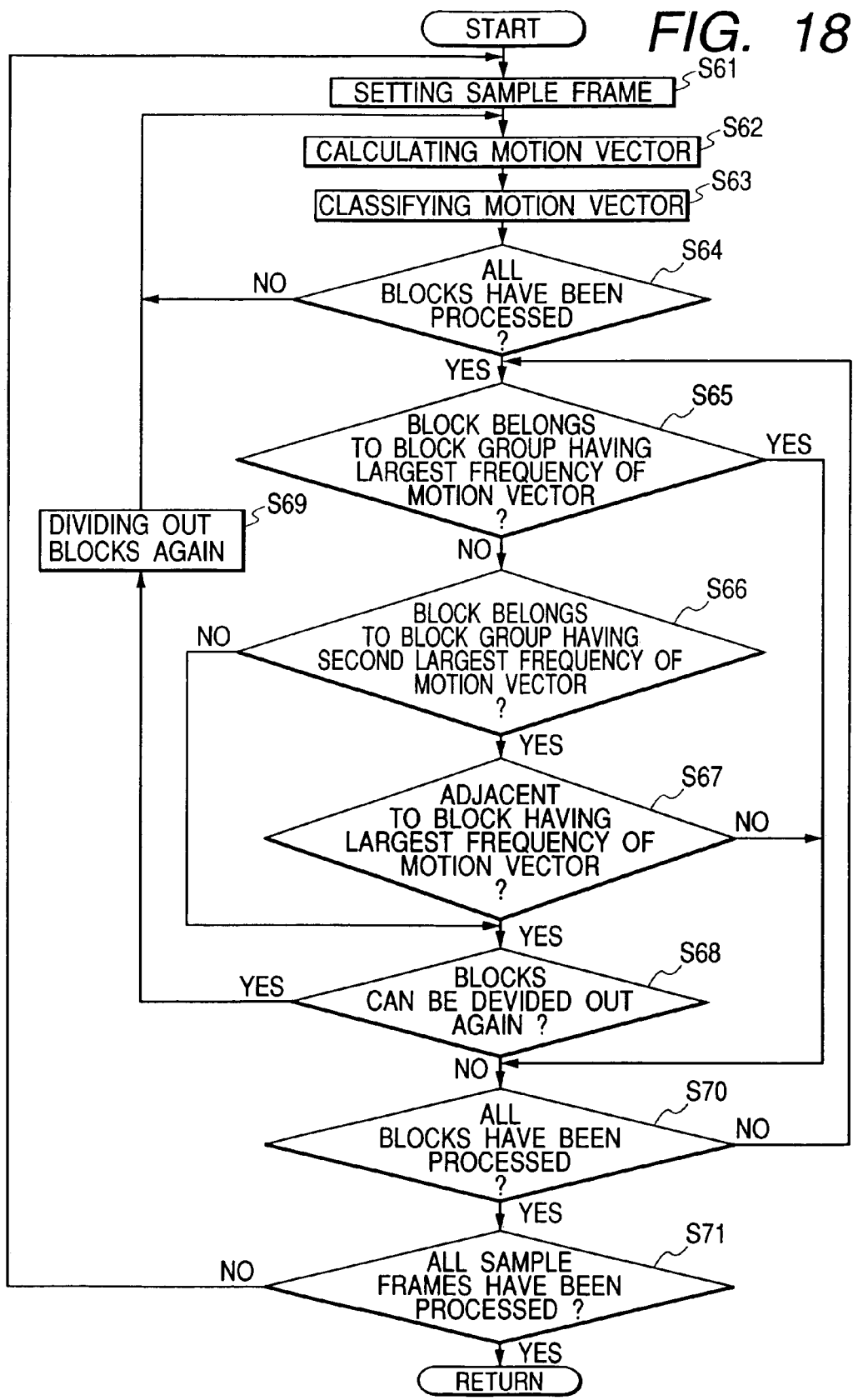
FIG. 18 is a flow chart illustrating the characteristic operation according to a second embodiment of the invention.

FIG. 18 is a flow chart illustrating only the characteristic operation of the image processing apparatus of the second embodiment. Namely, the flow chart shown in FIG. 18 is used for an alternative of the processes at Steps S5 to S8 shown in FIG. 2, and the other processes are similar to those shown in the flow chart of FIG. 2.

Similar to Steps S5 to S8 shown in FIG. 2, a sample frame is first set to calculate and classify motion vectors of all blocks (Steps S61 to S64). It is checked what block group the occurrence frequency of motion vector of each block belongs to (Steps S65, S66). Blocks having the second largest occurrent frequency of motion vector and being adjacent to the block having the first largest occurrence frequency (Steps S66, S67) and blocks having the third or more largest occurrence frequency of motion vector (Step S66) are checked whether they can be divided again (Step S68). Each dividable block is divided further (Step S69). For example, if the block size is 16×16, this block is divided into four 8×8 blocks.

After the block is divided further (Step S69), the motion vector is again calculated and classified for all blocks (Steps S62 to S64). So long as each of blocks having the second largest occurrent frequency of motion vector and being adjacent to the block having the first largest occurrence frequency (Steps S66, S67) and blocks having the third or more largest occurrence frequency of motion vector (Step S66) can be re-divided (Step S68), the dividable block is divided further to repeat the processes at Steps S62 to S67.

By recursively dividing the block in this way, it is possible to reduce an area of the border block.

If it is judged that the block is no more dividable (Step S68), the group attributes of the blocks (including re-divided blocks) are maintained and the next block is processed in a similar manner described above (Steps S65 to S68).

If all blocks inclusive of re-divided blocks in the frame are processed (Step S70), then the sample frame is changed (Step S61) to repeat similar processes described above. If all sample frames are processed (Step S71), this routine is terminated to follow the processes at Step S9 and succeeding Steps shown in FIG. 2.

Figure 19:
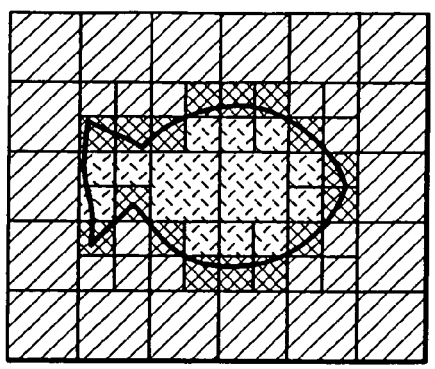
FIG. 19 is a schematic diagram illustrating block re-division.

FIG. 19 shows an example of the processed results by the method illustrated in FIG. 18. The block having the third or more largest occurrence frequency of motion vector is re-divided and also the block having the second largest occurrence frequency of motion vector and being adjacent to the block having the first largest occurrence frequency of motion vector, are re-divided. After re-division and re-classification, the object judgement is executed to determine the block having the first largest occurrent frequency of motion vector as the background block, the block having the second largest occurrent frequency of motion vector as the foreground block, and the block other than those blocks described above as the border block.

Figure 20:
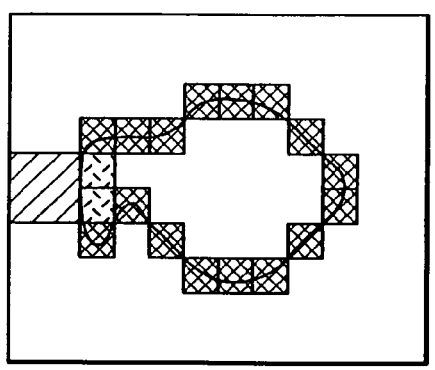
FIG. 20 is a schematic diagram illustrating an example of block positions of an initial outline according to the second embodiment.
Figure 21:
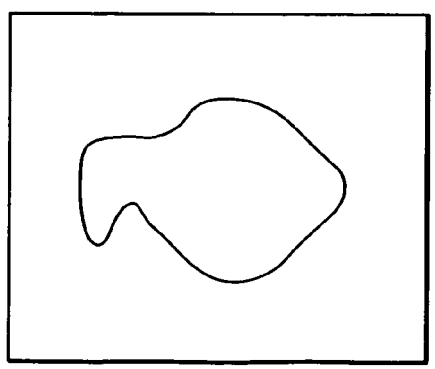
FIG. 21 is a diagram showing an example of an initial outline according to the second embodiment.
Figure 22A:
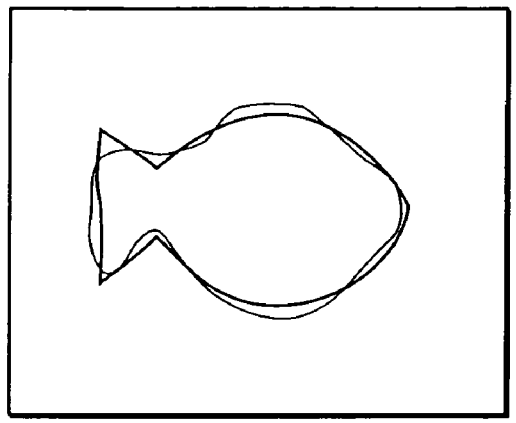
FIGS. 22A, 22B and 22C are schematic diagrams illustrating convergence of an outline according to the second embodiment.
Figure 22B:
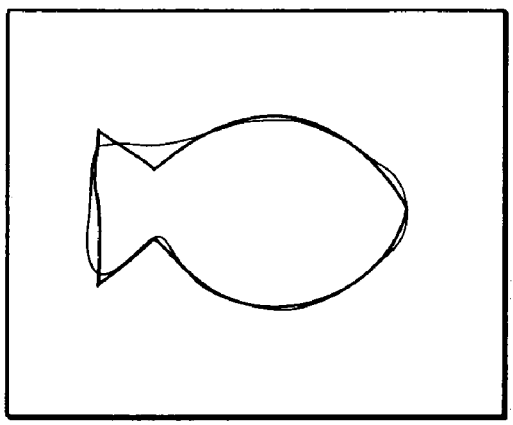
Figure 22C:
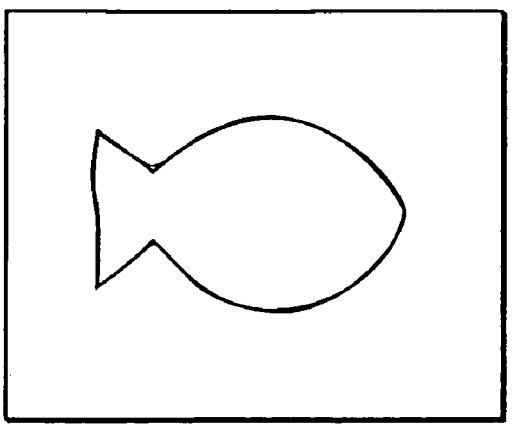

FIG. 20 shows only the blocks used for initial outline setting of the example shown in FIG. 19. FIG. 21 shows an initial outline obtained by the example shown in FIG. 20. It can be understood that the initial outline can be obtained with a higher precision than that of the initial outline (FIG. 9) of the first embodiment. FIGS. 22A to 22C illustrate convergence of the initial outline shown in FIG. 21 into the outline of the object.

The invention is applicable to a system constituted of a plurality of apparatuses or to a single apparatus. The scope of the invention also includes the case wherein a computer (CPU or MPU) of the apparatus or system connected to various devices realizing the functions of each embodiment described above, is supplied with software program codes realizing the functions of each embodiment and the various devices are operated in accordance with programs stored in the computer of the system or apparatus.

In such a case, the program codes themselves realize the functions of each embodiment. The program codes themselves and means for supplying the computer with the program codes, e.g., a storage medium storing such program codes, constitute the present invention. The storage medium for storing such program codes may be a floppy disk, a hard disk, an optical disk, a magnetooptical disk, a CD-ROM, a magnetic tape, a nonvolatile memory card, a ROM or the like.

It is obvious that an embodiment of the invention also includes not only the case wherein the functions of each embodiment can be realized by executing the program codes read by the computer, but also the case wherein the functions of each embodiment can be realized by the program codes in cooperation with an OS (operating system) running on the computer, application software or the like.

It is obvious that the scope of the invention also contains the case wherein the functions of each embodiment can be realized by writing the supplied program codes into a memory of a function expansion board inserted into the computer or of a function expansion unit connected to the computer, and thereafter by executing a portion or the whole of actual processes by a CPU of the function expansion board or function expansion unit.

The shape and structure of each device of the embodiments are only given for illustrative purposes only for embodying the invention and are not to be construed as imposing any limitation to the technical scope of the invention. The invention can therefore be embodied in various ways without departing from the spirit and main features of the invention.

As described so far, according to the embodiments, the initial outline of a top frame used in extracting an object of a moving image can be automatically set with a high precision. Accordingly, a user burden can be reduced considerably. Since the initial outline can be set automatically, the initial outline can be obtained with good reproductivity.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus, comprising:
   a) input means for inputting consecutive image data;
   b) dividing means for dividing the image data into blocks each constituted of a plurality of pixels;
   c) detecting means for detecting a motion vector of each block;
   d) judging means for classifying blocks into at least an object block, a background block and a border block in accordance with a frequency of occurrence of the motion vectors detected by said detecting means, the border blocks forming a boundary area between the object blocks and the background blocks corresponding to a background area of an object; and
   e) extracting means for setting an initial contour of the object in accordance with the border blocks judged by said judging means, and extracting an object area using the set initial contour and an active outline model.

2. An apparatus according to claim 1, wherein said judging means judges a block from which the motion vector having a first largest occurrence frequency was detected, as the background block, and a block from which the motion vector having a second largest occurrence frequency was detected, as the object block.

3. An apparatus according to claim 2, wherein said judging means judges a block from which the motion vector having a third or more largest occurrence frequency was detected, as the border block.

4. An apparatus according to claim 2, wherein said judging means calculates similarity degrees of the motion vectors of the background and object blocks relative to the block from which the motion vector having a third or more largest occurrence frequency was detected, and re-classifies the block in accordance with the similarity degrees.

5. An apparatus according to claim 4, wherein the similarity degree is calculated from an inner product of motion vectors.

6. An apparatus according to claim 4, wherein the similarity degree is calculated from a distance between motion vectors.

7. An apparatus according to claim 1, wherein said judging means judges a block from which the motion vector having a first largest occurrence frequency was detected, as the background block, and a block from which the motion vector having a second or more largest occurrence frequency was detected and being adjacent to the background block, as the border block.

8. An apparatus according to claim 1, wherein said judging means judges a block from which the motion vector having a second largest occurrence frequency was detected, as the object block, and a block from which the motion vector having a first largest occurrence frequency was detected and being adjacent to the object block, as the border block.

9. An apparatus according to claim 1, wherein said judging means re-divides the block divided by said dividing means into second blocks and classifies the second blocks into one of an object block, a background block and a border block.

10. An apparatus according to claim 9, wherein said judging means re-divides the block from which the motion vector having a third or more largest occurrence frequency was detected, into the second blocks.

11. An apparatus according to claim 10, wherein said judging means re-divides a block from which the motion vector having a second largest occurrence frequency was detected and which is adjacent to the block from which the motion vector having a first largest occurrence frequency was detected, into the second blocks.

12. An apparatus according to claim 10, wherein said judging means re-divides a block from which the motion vector having a first largest occurrence frequency was detected and which is adjacent to the block from which the motion vector having a second largest occurrence frequency was detected, into the second blocks.

13. An apparatus according to claim 1, further comprising encoding means for encoding the image data in the object area extracted by said extracting means.

14. An apparatus according to claim 13, wherein said encoding means encodes the image data in the background area.

15. An apparatus according to claim 13, further comprising transmitting means for transmitting the image data encoded by said encoding means.

16. An apparatus according to claim 13, further comprising recording means for recording the image data encoded by said encoding means in a storage medium.

17. A computer-readable storage medium storing program codes for causing a computer to perform image processing steps, the program codes comprising:

a) codes for an input step of inputting consecutive image data;

b) codes for a dividing step of dividing the image data into blocks each constituted of a plurality of pixels;

c) codes for a detecting step of detecting a motion vector of each block;

d) codes for a judging step of classifying blocks into at least an object block, a background block and a border block in accordance with a frequency of occurrence of the motion vectors detected by the detecting step, the border blocks forming a boundary area between the object blocks and the background blocks corresponding to a background area of an object; and e) codes for an extracting step of setting an initial contour of the object in accordance with the border block judged in said judging step, and extracting an object area using the set initial contour and an active outline model.

18. An image processing apparatus, comprising:

a) an input unit, arranged to input consecutive image data;

b) a dividing unit, arranged to divide the image data into blocks each constituted of a plurality of pixels;

c) a detecting unit, arranged to detect a motion vector of each block;

d) a judging unit arranged to classify blocks into at least an object block, a background block and a border block in accordance with a frequency of occurrence of the motion vectors detected by said detecting unit, the border blocks forming a boundary area between the object blocks and the background blocks corresponding to a background area of an object; and e) an extracting unit, arranged to set an initial contour of the object in accordance with the border block judged by said judging unit, and to extract an object area using the set initial contour and an active contour model.

* * * * *